United States Patent [19]

Mackarous

[11] Patent Number: 4,585,684

[45] Date of Patent: Apr. 29, 1986

[54] EMBOSSED CREST, BADGE AND THE LIKE WEARING ORNAMENT AND METHOD OF MAKING THE SAME

[76] Inventor: George Mackarous, 1830 Parent Street, Laval, Canada, H7E 3Z1

[21] Appl. No.: 669,968

[22] Filed: Nov. 9, 1984

[30] Foreign Application Priority Data

Oct. 10, 1984 [CA] Canada .................................. 465094

[51] Int. Cl.[4] .......................... B32B 31/20; B44C 3/02

[52] U.S. Cl. ....................................... 428/79; 156/213; 156/308.4; 428/160

[58] Field of Search .......................... 428/79, 160, 225; 156/213, 308.4

[56] References Cited

U.S. PATENT DOCUMENTS

| | | | |
|---|---|---|---|
| 2,729,009 | 1/1956 | Markus et al. | 428/79 X |
| 2,729,010 | 1/1956 | Markus et al. | 428/79 X |
| 2,859,152 | 11/1958 | Markus et al. | 428/79 X |
| 2,891,340 | 6/1959 | Markus et al. | 428/79 |
| 3,051,600 | 8/1962 | Markus et al. | 428/79 X |
| 3,256,131 | 6/1966 | Koch et al. | 428/161 X |
| 3,758,358 | 9/1973 | Kuroda | 428/79 X |
| 4,160,685 | 7/1979 | Kuroda | 428/79 X |

FOREIGN PATENT DOCUMENTS

| | | |
|---|---|---|
| 559560 | 7/1958 | Canada . |
| 567505 | 12/1958 | Canada . |
| 951890 | 7/1974 | Canada . |
| 972154 | 8/1975 | Canada . |
| 1006671 | 3/1977 | Canada . |

*Primary Examiner*—Henry F. Epstein

[57] ABSTRACT

The wearing ornament of the invention is designed to be attached to a cap, a suit and the like wearing apparel. It consists of a flat laminated fabric having a central embossed area. The cover layer of the fabric is printed with an image having a central portion of a contour and size corresponding to the embossed area. This cover layer is made of a woven fabric which is stretchable in two perpendicular directions. A second layer consists of compressible foamed synthetic resin, die-cut to the contour of the central portion of the image; a third layer consists of a heat-seal thermoplastic film, while a fourth layer consists of a stiff backing, preferably of felt-like fibrous material; all of the layers are pressed together in a heat-sealing press, the female die of which has a central cavity shaped to receive the central portion of the cover layer and the second layer.

6 Claims, 3 Drawing Figures

EMBOSSED CREST, BADGE AND THE LIKE WEARING ORNAMENT AND METHOD OF MAKING THE SAME

FIELD OF THE INVENTION

The present invention relates to a crest, badge and the like wearing ornament and to a method of making the same and, more particularly, to such an ornament which is embossed.

BACKGROUND OF THE INVENTION

It is known to provide a wearing ornament of the character described which is made by an embroidery process. However, such a process is expensive and time-consuming. U.S. Pat. No. 3,256,131, issued June 14, 1966 to A. G. Koch et al, describes an embossed laminated fabric for use, for instance, on the inner surface of automobile doors, on automobile seats and the like. This fabric comprises a cover layer, an intermediate continuous layer of urethane foam and a continuous backing layer of nylon or similar woven material, with all the layers adhered by a liquid layer of anhydrous polyurethane, which is applied against the inside surface of the cover layer and backing layer, and then the laminated material is pressed and heated in accordance with a definite pattern to cause foaming of the liquid polyurethane and adhesion of the different layers.

The invention in accordance with this U.S. Patent is not designed to make wearing ornaments bearing an image on its exposed face and, moreover, it involves applying a liquid polyurethane in pre-polymer form which involves a complicated operation and expensive equipment.

OBJECTS OF THE INVENTION

It is the general object of the present invention to provide a wearing ornament, such as badge, crest or the like, which is embossed and is of simple and inexpensive manufacture.

Another object of the invention is to provide a method of making the embossed wearing ornament in accordance with the invention.

Another object of the invention is to provide a wearing ornament of the character described, in which the embossed portion varies in thickness across the central portion of the ornament, said embossed portion having the size and contour of the central portion of image printed on the cover layer, thereby resulting in a very effective and decorative wearing ornament.

SUMMARY OF THE INVENTION

The wearing ornament of the invention is a laminated fabric which comprises a first cover layer made of a woven fabric which is stretchable in two perpendicular directions, said cover layer having an image printed on its exposed surface, said image including a central portion, a second layer of flexible and compressible foamed synthetic resin, which is die-cut to the contour and size of the central portion of the image; a third layer of adhesive and a fourth backing layer which is flexible but somewhat stiff, the first, third, and fourth layers being substantially co-extensive, the second layer having smaller dimensions than the remaining layers, all of the layers being superposed and said first and fourth layers being adhered by said third layer all around the second layer and in registry with one another, said first layer being stretched by said second layer and compressing the marginal portion of said second layer to a higher degree than the central portion of said second layer, so as to define an embossed ornament of a substantially uniform thickness in the area surrounding the second layer and of a varying thickness in the area across said second layer.

DETAILED DESCRIPTION OF THE PREFERRED EMBODIMENT

Figure 1:
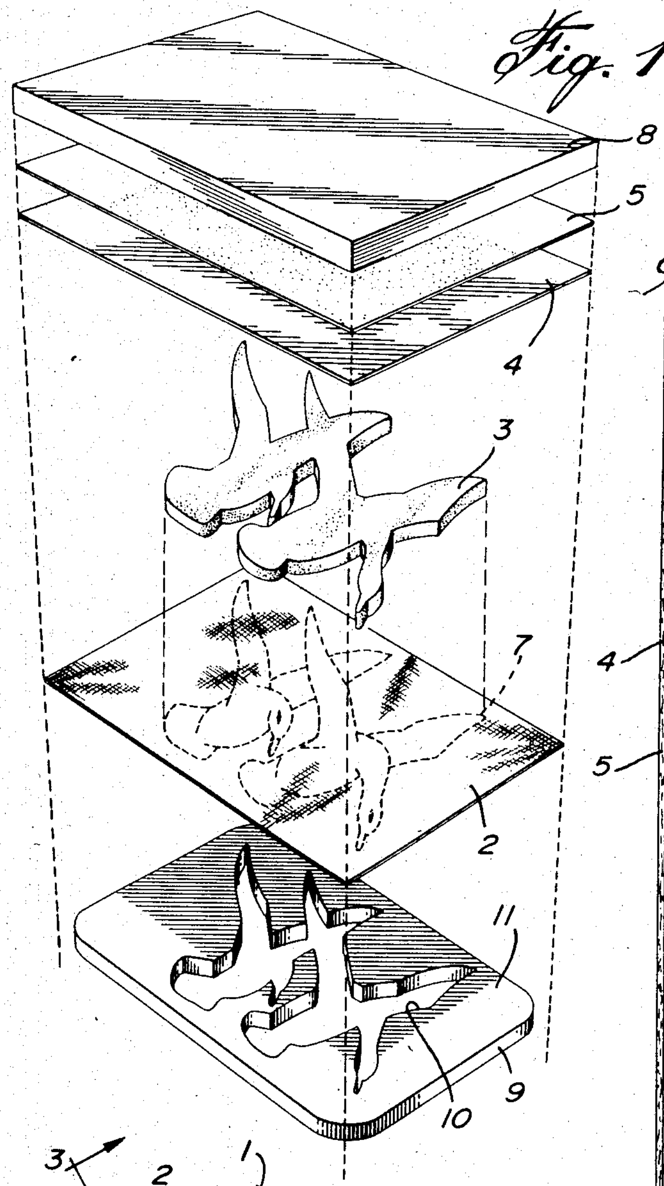
FIG. 1 is an exploded perspective view of the various layers composing the laminated fabric and of the male and female die-press for making the ornament of the invention.
Figure 2:
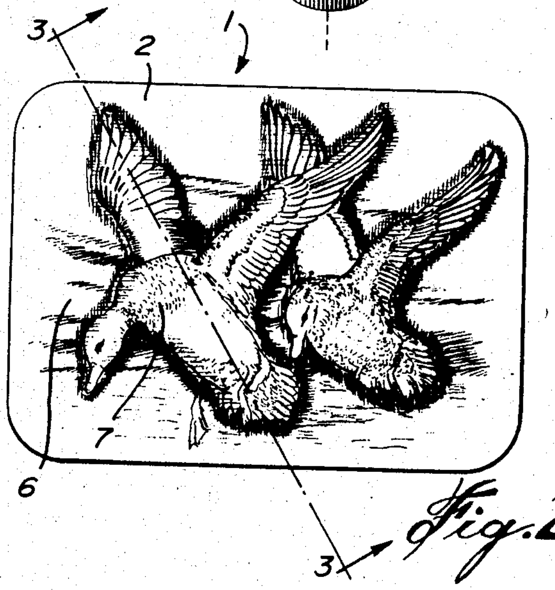
FIG. 2 is a top plan view of the ornament when totally assembled.
Figure 3:
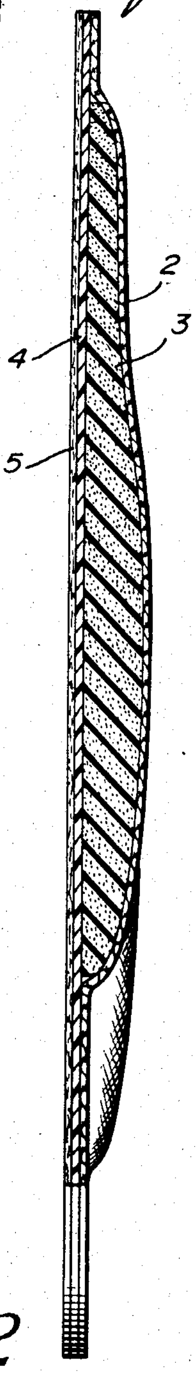
FIG. 3 is a section taken along line 3—3 of FIG. 2.

The wearing ornament of the invention is generally indicated at 1 and consists of a laminated fabric formed of a first cover layer 2; a second layer 3, of flexible and compressible foamed synthetic resin, such as foamed polyurethane; an adhesive layer 4 and a backing layer 5. The cover layer 2 is made of a woven fabric, which is stretchable in two perpendicular directions and has an exposed face which is printed with an image 6 defining a main central portion 7. The second layer 3, of foam material, has a contour and shape corresponding to the contour and shape of the central portion 7 of the printed image 6. The adhesive layer 4 preferably consists of a heat-seal film, that is a thermoplastic film such as polyethylene, polyvinyl or the like. The backing layer 5 is relatively stiff, although flexible, and preferably consists of a felt-like material of non-woven fibers; first cover layer 2, third adhesive layer 4 and fourth backing layer 5 have substantially the same dimensions which are greater than the dimensions of the second layer 3 when all of the layers are superposed and made in registry with the second layer 3 in registry with the central portion 7 of the image 6. When placed in a press, the cover layer 2 is adhered to the backing layer 5 all around the second foam layer and, at the same time, the cover layer 2 is stretched over the foam layer 3 and the latter is adhered to the backing layer. This lamination is preferably carried out in a laminating press including a heated male die-plate 8 and heated female die-plate 9 which has a central cavity 10, of a contour and size to receive the foam layer 3 and which has a flat marginal surface 11 surrounding the central cavity 10 and co-acting with the flat male die-plate 8. When all the layers have been inserted into the press and the latter actuated and heated, the heat-sealing film 4 will melt and cause adherence of the cover layer 2 to the backing layer 5 and will also cause adherence to a certain extent of the foam layer 3 to the backing 5. During the pressing movement, elasticity of the foam layer 3 will cause stretching of the cover layer 2 and, consequently, in the finished product, the embossed central portion carrying the central portion 7 of the image 6 will have a cross-section of a thickness which varies in proportion to its width and cover layer 13 remains wrinkle-free. The image will preferably be a color image and the resulting ornament will be very effective. Obviously, as shown, the central image area may consist of more than one embossed areas separated by flat areas.

The press may be provided with means to die-cut the three layers 2, 4, and 5 at the beginning of the heat-sealing and pressing operation. The heat-sealing thermoplastic adhesive film 4 could be replaced by a layer of liquid glue which may dry up by evaporation. However, such a system will take a much longer time to cure and a press will nevertheless be needed to press the various layers together and stretch the cover layer 2.

In the drawings, adhesive layer 4 is shown much thicker than necessary; actually, it is much thinner than backing layer 5.

The peripheral edge of ornament 1 could be finished with overlock stitching, if desired. This is not shown, as it forms no part of the invention.

What I claim is:

1. A wearing ornament such as a badge, crest and the like, made of a laminated fabric which comprises a first cover layer of woven fabric which is stretchable in two perpendicular directions, said first layer having an image prited on its exposed surface; a second layer die-cut of flexible and compressible foamed synthetic resin and having a generally constant thickness when not compressed; a third layer of adhesive; and a fourth flexible but stiff backing layer, said first, third, and fourth layers being substantially co-extensive, said second layer having smaller dimensions than the remaining layers, said first and fourth layers being directly adhered by said third layer all around said second layer in registry with one another, said first layer being stretched by said second layer and compressing the marginal portions of said second layer to a higher degree than the central portion of said second layer, so as to define an embossed ornament of uniform thickness in the area surrounding said second layer, and of a varying thickness in the area across said second layer wherein said first layer remains wrinkle-free, said second layer having a contour similar to a central portion of said image and registering therewith.

2. A wearing ornament as defined in claim 1, wherein said fourth backing layer is made of non-woven felt-like fibrous material.

3. A wearing ornament as defined in claim 2, wherein said adhesive layer is a heat-seal film of thermoplastic material.

4. The method of making a wearing ornament, such as a badge, crest and the like, made of a laminated fabric, comprising the steps of sizing a first, a third, and a fourth layer to a uniform size and shape; printing an image on the top surface of said first layer, said image having a central portion, die-cutting a second layer of flexible and compressible foamed synthetic resin with a memory to the size and contour of said central portion of said image said second layer having a generally constant thickness when not compressed, said first layer being a woven fabric stretchable in two perpendicular directions, said third layer being adhesive said fourth layer being a flexible but relatively stiff backing, superposing all of said layers in the named order and with the image exposed while registering said second layer with said central portion of said image and registering said first, third, and fourth layers and applying said superposed layers with said first layer first against a female die having a cavity with a contour conforming to said die-cut second layer, with said marginal portion of said layer applied against the flat surface of said female die and with the central portion of said first layer bearing the central image portion together with said second layer engaging said cavity, and applying a flat male die onto said fourth layer under a pressure and for a time sufficient to cure said adhesive layer.

5. The method as defined in claim 4, wherein said third layer is a thermoplastic film and said male and female dies are heated to heat said layers while under pressure to cause melting of said film and adherence thereby of said first to said fourth layers around said second layer.

6. The method as defined in claim 5, wherein said fourth layer is a non-woven felt-like fibrous material.

* * * * *